United States Patent
Beacham, Jr. et al.

(10) Patent No.: US 11,590,634 B2
(45) Date of Patent: Feb. 28, 2023

(54) APPARATUS AND METHOD FOR IN-MANUFACTURING EVALUATION OF STRUCTURAL AND MATERIAL PROPERTIES OF FASTENERS USING MACHINE LEARNING

(71) Applicant: GE Precision Healthcare LLC, Wauwatosa, WI (US)

(72) Inventors: Jimmie A. Beacham, Jr., West Allis, WI (US); Tao Jia, Oak Creek, WI (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 128 days.

(21) Appl. No.: 17/070,618

(22) Filed: Oct. 14, 2020

(65) Prior Publication Data

US 2022/0111496 A1 Apr. 14, 2022

(51) Int. Cl.
  *B25B 21/00* (2006.01)
  *G06N 20/00* (2019.01)

(52) U.S. Cl.
  CPC .......... *B25B 21/008* (2013.01); *B25B 21/007* (2013.01); *G06N 20/00* (2019.01)

(58) Field of Classification Search
  CPC ... B25B 21/00; B25B 21/008; B25B 21/0023; B25B 21/0026
  USPC ........................................ 173/181, 1, 2, 176
  See application file for complete search history.

(56) References Cited

U.S. PATENT DOCUMENTS

| | | | |
|---|---|---|---|
| 10,625,405 B2 | 4/2020 | Silba et al. | |
| 2004/0172800 A1* | 9/2004 | Seith | B25B 23/14 29/407.01 |
| 2018/0169844 A1* | 6/2018 | Nemecek | G09F 3/0297 |
| 2021/0331305 A1* | 10/2021 | Murui | G05B 15/02 |

OTHER PUBLICATIONS

Eccles, W., "A new approach to the checking of the tightness of bolted connections", LUBMAT 2014, Manchester, UK, pp. No. L144056, 9 pages.
W. Eccles 1, "A new approach to the checking of the tightness of bolted connections," Lubrication, Maintenance and Tribotechnology LUBMAT, 2014, Manchester.UK pp. No. L144056, 9 pages.

* cited by examiner

*Primary Examiner* — Chelsea E Stinson
(74) *Attorney, Agent, or Firm* — Boyle Fredrickson, S.C.

(57) ABSTRACT

An apparatus and method for detecting structural and material defects in a fastener driven during a manufacturing process includes a driving tool capable of recording an angle-torque trace during the driving of the fastener and a machine learning engine operably connected to the driving tool for analyzing the recorded angle-torque trace. The machine learning engine can be provided with a number of sample angle-torque traces from sample fasteners and can self-determine a stored trace including tolerances for acceptable angle-torque trace data from the samples in an unsupervised learning process or protocol without the need for defined anomalous and non-anomalous samples being provided to the machine learning engine. Using the self-defined stored trace and acceptable tolerances, the machine learning engine can analyze attributes of subsequently recorded angle-torque traces to ascertain whether the attributes of the recorded angle-torque traces indicate anomalies within the fastener identified by the recorded trace.

17 Claims, 3 Drawing Sheets

APPARATUS AND METHOD FOR IN-MANUFACTURING EVALUATION OF STRUCTURAL AND MATERIAL PROPERTIES OF FASTENERS USING MACHINE LEARNING

FIELD OF THE DISCLOSURE

The present disclosure relates generally to fasteners utilized in medical device manufacturing and assembly, and more particularly to systems for assessing the structural and material properties of those fasteners for use in manufacturing the medical devices.

BACKGROUND OF THE DISCLOSURE

A wide variety of medical devices are constructed using various types of fasteners, such as threaded fasteners including screws and bolts, to assemble the components of the medical device to one another. A threaded fastener is equivalent to a strong spring in which the threads act like an incline plane to create a high mechanical advantage between torque and clamp force of the bolt. When a proper amount of torque is applied to a bolt or other threaded fastener, sufficient pre-load or clamping force is applied between the components secured together by the bolt. The bolted joint needs to be designed around this clamp force, especially in high stress and vibration applications, such as various medical devices including x-ray systems and the like, among others.

These fasteners are engaged with the components of the medical device using digital torque drivers or other suitable tools. The drivers enable the individual to accurately apply torque to the fastener during the assembly process in order to avoid under-tightening or overtightening the fasteners, each of which can result in an improper clamp force on the fastener and consequent damage to the components of the medical device when operated.

With many medical devices, the tolerance for the torque to be applied to engage a fastener with the medical device components is predetermined. As such, when assembling a medical device, the individual has only to operate the torque driver or other tool until the torque applied to the fastener reaches the predetermined amount, as displayed directly on the driver or other display operably connected to the driver.

Alternatively, the driver or tool can be controlled by a suitable control system operably connected to the driver. Once the driver is engaged with the fastener by the individual, the control system can operate the driver to apply the correct torque to the fastener for proper tightening of the fastener.

To provide the preset torque limits to the individual or through the control system, in either case the preset torque limits are stored within a suitable database operably connected to, or integrated with the control system. When the individual is ready to engage the driver with the fastener to be tightened, the control system can access the database to locate the preset torque value to be applied to the particular fastener, and then either display the value to the individual, or directly operate the driver to apply the proper torque value to the fastener.

While the database provides the proper torque preset value for a particular fastener, these presets are determined with the assumption that the fasteners are themselves manufactured within the proper tolerances for the fastener itself, i.e., that there are no defects in the structural and/or material properties of the fastener.

Fasteners, such as bolts and screws, as classified into different sizes and classes, and are identified as categorized parts, with fasteners of the same size and class being assumed to have identical properties regardless of the manufacturer of the fastener. However, as a result of any number of factors, such as different raw materials used to form the fastener, different heat treatment processes utilized on the fastener, and/or different manufacturing processes, fasteners from different manufacturers can have very different material and/or structural properties.

The inconsistencies in these structural and material properties across manufacturers results in varying performances of the fasteners when utilized. For example, a bolt working as a spring to clamp two components together can perform drastically different as a result of variations in the structural and/or material properties of the bolt, often resulting in variation in the clamp load provided by the bolt and consequent bolted joint failure in the field. Therefore, if the fastener has certain defects in its material and/or structure a result of its manufacture, those differences can result in premature failure of the fastener even if the torque applied to the fastener is within proper tolerances.

However, on many occasions the structural and/or material defects are not readily observable and enable the fastener to pass inspection after manufacture. Some manufacturers perform destructive sample testing on samples from batches of fasteners in an attempt to limit these issues, but there currently is no manner in which each fastener being utilized can be evaluated to determine the presence of any structural and/or material property defects in the fastener.

Therefore, it is desirable to develop a system for assessing the structural and material properties of the fastener during use of the fastener in manufacturing process that does not require additional testing procedures or equipment for the evaluation.

SUMMARY OF THE DISCLOSURE

According to one aspect of an exemplary embodiment of the invention, an automated fastener evaluation system is provided that assesses the structural and/or material properties of a fastener during the use of the fastener in a manufacturing process for a device, such as a medical device. The fastener is engaged with the components forming the medical device using a suitable torque driver that is operably connected to a control system. The control system accesses a database of torque value presets and determines the value of torque to be applied to the particular fastener. The torque driver is engaged with the fastener and the driver is activated by the individual or the control system to apply the preset torque to the fastener.

As the torque is applied to the fastener via the tool, e.g., torque driver or torque wrench, the control system records the value of the torque applied to the fastener over time in the form of an angle-torque trace. The angle-torque trace identifies the amount and timing of the torque applied to the fastener as the driver is acting on the fastener. By analyzing the attributes of the angle-torque trace, it is possible to determine different properties of the structure and/or material forming the fastener and locate certain structural and/or material deficiencies of the individual fastener in order to consequently remove the fastener from the assembly of the device.

According to another aspect of an exemplary embodiment of the present invention, the analysis of the angle-torque traces is automatically performed using an unsupervised artificial intelligence (AI) system. The AI system can be provided with a number of sample angle-torque traces from sample fasteners and can self-determine the parameters for acceptable angle-torque trace data from the samples in an unsupervised manner without the need for defined good and bad samples being provided to the AI system. Using the self-defined acceptable parameters or tolerances, the AI system can analyze subsequent angle-torque traces to ascertain whether the properties of the traces are within the acceptable tolerances for the fastener.

According to a further aspect of an exemplary embodiment of the invention, the method for analyzing the angle-torque trace for each fastener utilized in the assembly enables the analysis of individual fasteners without requiring additional measurement equipment. The normal control systems for the fastener driver or tool including the capability of determining and recording the angle-torque trace for the fasteners applied by the torque tool provide the necessary data for analysis of the traces.

According to still another aspect of an exemplary embodiment of the invention, the method of analyzing the angle-torque trace enables the evaluation of specific defects within the fastener being analyzed. Thus, the analysis allows defects in the fastener and in the tooling utilized in forming the fastener to be identified and utilized in removing defective fasteners and defective tooling from service.

According to still a further aspect of an exemplary embodiment of the invention, a method for automatically detecting anomalies in the structure or material forming a fastener utilized in the assembly of a medical device includes the steps of providing an apparatus having a driving tool capable of recording an angle torque trace for a fastener driven by the tool to form a recorded trace and a processor operably connected to the driving tool and including an machine learning engine stored on the processor, driving a fastener to secure components of a medical device with the driving tool, recording data forming an angle-torque trace while driving the fastener to form the recorded trace, and comparing a stored angle-torque trace created by the machine learning engine with the recorded trace to detect anomalies.

According to still another aspect of an exemplary embodiment of the invention, an apparatus for the automatic detection of anomalies in the structure or material forming a fastener utilized in the assembly of a device includes a driving tool capable of recording an angle torque trace for a fastener driven by the tool to from a recorded trace; and a processor operably connected to the driving tool and including a machine learning engine stored on the processor, wherein the machine learning engine is configured in an unsupervised learning protocol to automatically analyze recorded angle-torque traces for individual fasteners engaged by the tool to detect anomalies in the structure and material forming the fasteners based upon tolerances determined by the machine learning engine.

These and other exemplary aspects, features and advantages of the invention will be made apparent from the following detailed description taken together with the drawing figures.

BRIEF DESCRIPTION OF THE DRAWINGS

The drawings illustrate the best mode currently contemplated of practicing the present invention.

In the drawings.

DETAILED DESCRIPTION OF THE DRAWINGS

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

Figure 1:
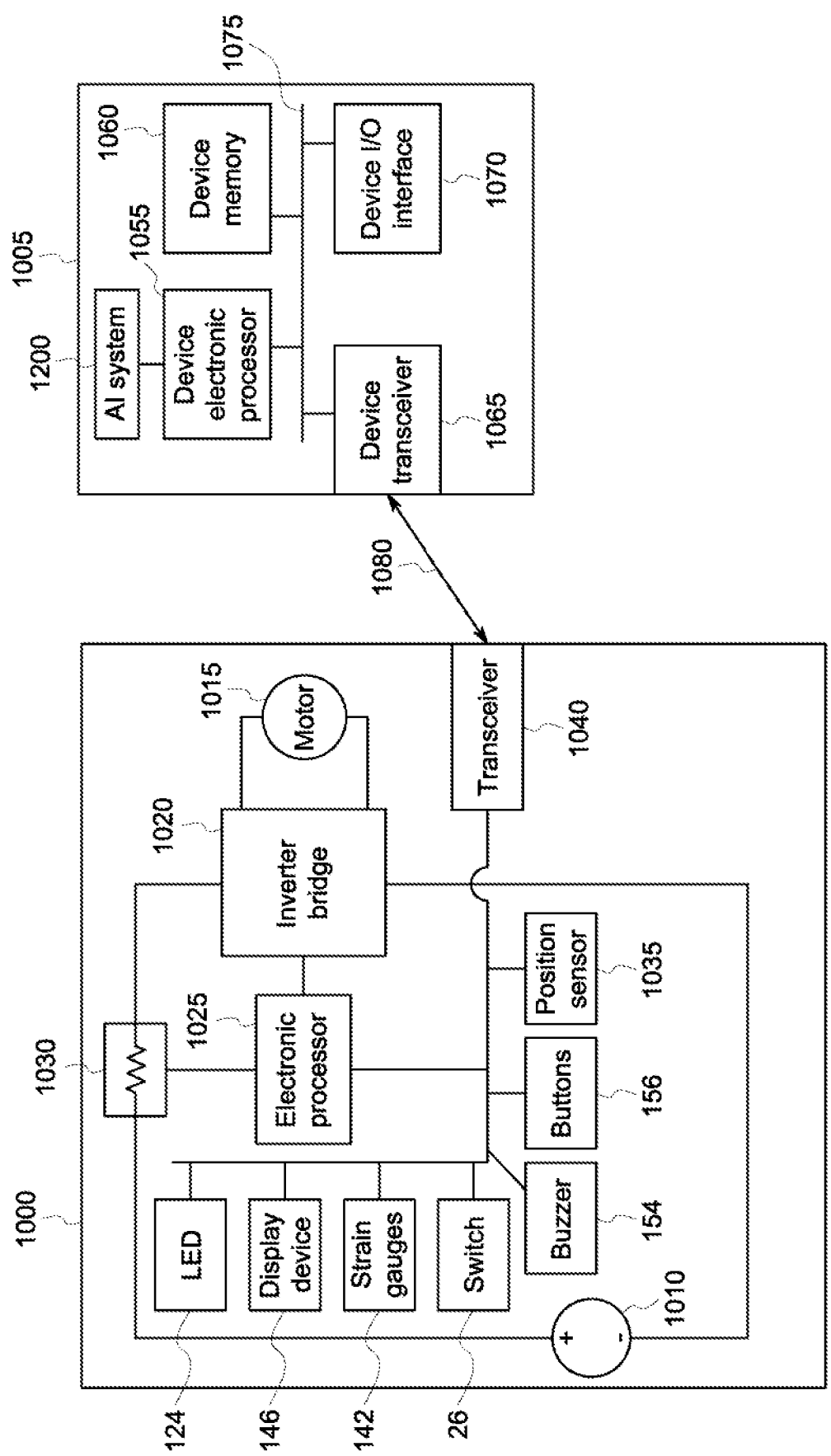
FIG. 1 is a schematic view of a powered ratcheting torque wrench in accordance with an exemplary embodiment of the invention.

As shown in FIG. 1, a block diagram of one embodiment of a power tool 1000 communicating with a remote device 1005 is illustrated, as disclosed in U.S. Pat. No. 10,625,405, entitled Powered Ratcheting Torque Wrench, which is hereby incorporated by reference in its entirety for all purposes. In some embodiments, the power tool 1000 is a powered ratcheting torque-wrench, though the power tool 1000 may be a different power tool such as a screwdriver/nutrunner, a hammer drill, or the like. The remote device 1005 is, for example, a smart telephone, a laptop computer, a tablet computer, a desktop computer, or the like.

The power tool 1000 includes a power supply 1010, a motor 1015, an inverter bridge 1020, an electronic processor 1025, a torque sensor 1030, a position sensor 1035, and optionally a transceiver 1040. In some embodiments, the power tool 1000 further includes a power switch 26 for connecting the power supply 1010 to the motor 1015, an LED 124, strain gauges 142, display device 146, buzzer 154, and control buttons 156 which are electrically connected to the electronic processor 1025 and operate to sense torque applied by the tool and indicate the amount of torque being applied by the tool 1000 to the user. The remote device 1005, which can have a wired or wireless connection 1080 to the tool 1000 and can be a remote server or cloud-based system, among others, includes a device electronic processor 1055, a device memory 1060, optionally a device transceiver 1065, and a device input/output interface 1070. The device electronic processor 1055, the device memory 1060, the device transceiver 1065, and the device input/output interface 1070 communicate over one or more control and/or data buses (for example, a communication bus 1075). FIG. 1 illustrates only one example embodiment of a power tool 1000 and a remote device 1005. The power tool 1000 and/or the remote device 1005 may include more of fewer components and may perform functions other than those explicitly described herein.

The power supply 1010 may be a battery pack, an AC utility source, or the like. The motor 1015 is, for example, an electric brushless DC motor controlled by the electronic processor 1025 through the inverter bridge 1020.

In some embodiments, the electronic processor 1025 is implemented as a microprocessor with separate memory, such as to store, optionally temporarily, information relating to torque preset values for fasteners to be driven by the tool 1000. In other embodiments, the electronic processor 1025 may be implemented as a microcontroller (with memory on the same chip). In other embodiments, the electronic processor 1025 may be implemented using multiple processors. In addition, the electronic processor 1025 may be implemented partially or entirely as, for example, a field-programmable gate array (FPGA), an applications specific integrated circuit (ASIC), and the like and a memory may not be needed or may be modified accordingly. The device electronic processor 1055 may be implemented in various ways including ways that are similar to those described above with respect to electronic processor 1025. In the example illustrated, the device memory 1060 includes non-transitory, computer-readable memory that stores instructions that are received and executed by the device electronic processor 1055 to carry out the functionality of the remote device 1005 described herein. The device memory 1060 may include, for example a program storage area and a data storage area. The program storage area and the data storage area may include combinations of different types of memory, such as read-only memory and random-access memory, which may be utilized in any combination to store data relating to torque preset values for fasteners to be driven by the tool 1000 that can be transmitted to the tool 1000, and angle-torque trace data 1200 (FIG. 3) recorded by the tool 1000 and relating to fasteners driven by the tool 1000 for analysis by the device electronic processor 1055.

The transceiver 1040 enables wired or wireless communication between the power tool 1000 and the remote device 1005. In some embodiments, the transceiver 1040 is a transceiver unit including separate transmitting and receiving components, for example, a transmitter and a receiver. The device transceiver 1065 enables wired or wireless communication between the remote device 1005 and the power tool 1000. In some embodiments, the device transceiver 1065 is a transceiver unit including separate transmitting and receiving components, for example, a transmitter and a receiver.

The device input/output interface 1070 may include one or more input mechanisms (for example, a touch pad, a keypad, a button, a knob, and the like), one or more output mechanisms (for example, a display, a speaker, and the like), or a combination thereof, or a combined input and output mechanism such as a touch screen.

The torque sensor 1030 is used to measure an output torque of the power tool 1000. In the exemplary illustrated embodiment, the torque sensor 1030 is a current sense resistor (e.g., a current sensor) connected in a current path of the power tool 1000. The torque sensor 1030 therefore measures a motor current (which is directly proportional to the output torque) flowing to the motor 1015 and provides an indication of the motor current to the electronic processor 1025. As illustrated, the power tool 1000 includes both the torque sensor 1030 providing a current-based torque measurement, and the strain gauges 142 providing a strain-based torque measurement. However, in some embodiments, one, but not both, of the torque sensor 1030 and the strain gauges are provided in the power tool 1000 to provide torque measurement data to the electronic processor 1025. As a further alternative, the power tool 1000 may include a transducer assembly to directly measure the torque output by the power tool 1000 at its output shaft.

The position sensor 1035 is used to measure an absolute or relative position of the power tool 1000. In one example, the position sensor 1035 is an inertial measurement unit including one or more of an accelerometer, a gyroscope, a magnetometer, and the like. The position sensor 1035 may determine a position of the power tool 1000 based on a dead reckoning technique. That is, the position sensor 1035 may calculate a position of the power tool 1000 by using a previously determined position, and advancing that position based upon readings from the accelerometer, the gyroscope, the magnetometer, etc.

In addition to recording torque values for the fastening operation, in an exemplary embodiment of the tool 1000, the electronic processor 1025 also detects and records angular displacement of the fastener for recording the angular displacement in association with the torque being applied to the fastener. The electronic processor 1025 may measure the angular displacement in any suitable manner, such as based on signals received from a Hall-effect sensor unit (not shown) of the motor 1015.

Figure 2:
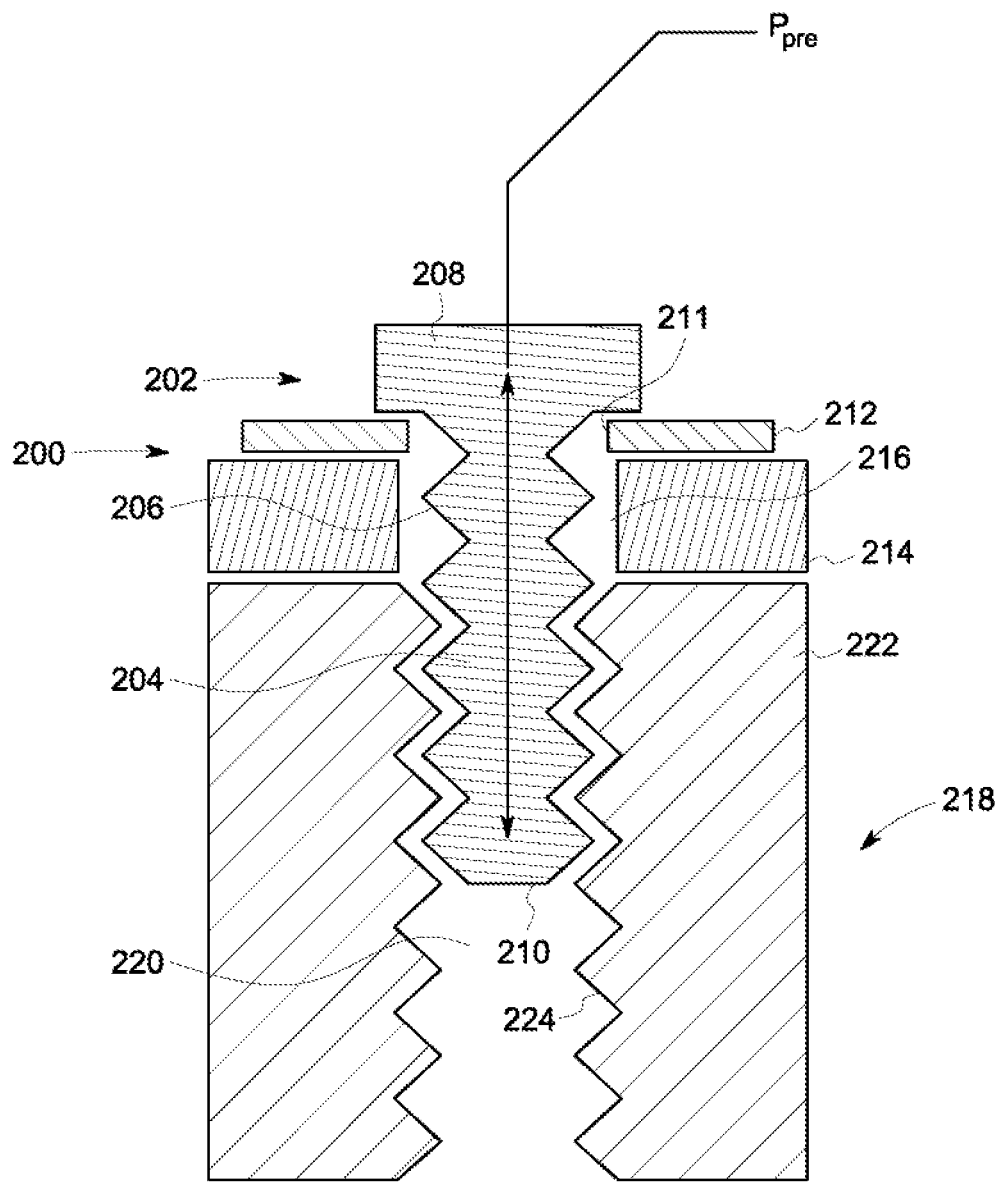
FIG. 2 is a schematic view of bolt joint in a medical device constructed according to an exemplary embodiment the present disclosure.

Referring now to FIG. 2, an exemplary structure of a bolted joint 200 formed utilizing the tool 1000 is illustrated. The joint 200 includes a bolt 202 formed with a shaft 204 having external threads 206 thereon and a head 208 at one end that is engaged by the tool 1000 to rotate and drive the bolt 200. The end 210 of the bolt 202 opposite the head 208 is inserted through an opening 211 in an optional washer 212 and through an aperture 214 formed in a first component/part 216 of the medical device 218. The aperture 214 of the first component 216 is aligned with a bore 220 formed in a second component/part 222 of the device 218. The bore 220 includes internal threads 224 that are engageable with the external threads 206 on the shaft 208 of the bolt 202. As the head 208 is formed to be larger in diameter that the opening 211 and aperture 214, the engagement of the external threads 206 on the bolt 202 with the internal threads 224 in the bore 220 enables the bolt 202 to clamp the washer 212 and first component 216 between the head 208 and the second component 222 to form the bolted joint 200.

Figure 3:
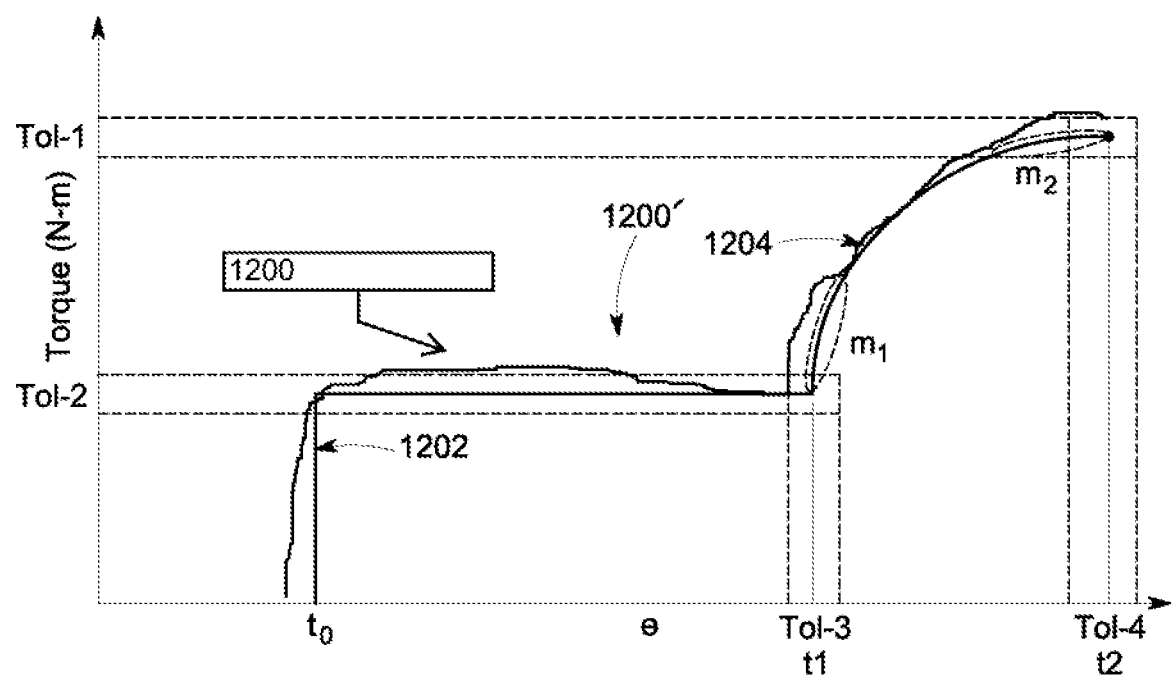
FIG. 3 is a graph of an exemplary angle-torque trace recorded for the insertion of the bolt into the joint of FIG. 2 according to an exemplary embodiment of the present disclosure.

The electronic processor 1025/electronic device processor 1055 generates an angle-torque trace based on the recorded torque values and the recorded angular displacement of the fastener/bolt 202 during the driving of the bolt 202 by the tool 1000. The angle-torque trace illustrates a mapping between the angular displacement of the fastener/bolt 202 and/or time and the torque output of the power tool 1000. FIG. 3 illustrates an example angle-torque trace 1200 for the power tool 1000 with the value for the torque applied to the fastener/bolt 202 in Nm plotted against the time or the angular rotation of the bolt 202. The angle-torque trace 1200 can be used in determining structural and/or material defects in the of the fastener/bolt 202 as described in detail below.

As can be seen in FIG. 3, the angle-torque trace 1200 includes an initial torque spike 1202 at time $t_0$ that corresponds to the initial engagement of the external threads 206 of the bolt 202 with the internal threads 224 within the bore 220 of the second component 222. As the tool 1000 continues to rotate the fastener or bolt 202 into the bore 220, the value of the torque applied to the bolt 202 remains relatively constant as the applied torque only needs to be sufficient to overcome the friction between the external threads 206 on the bolt 202 and the internal threads 224 of the bore 220, which is also called the run down torque for the bolt 202. Once the bolt 202 is rotated sufficiently that the bolt head 208 contacts the first component 216, or the washer 212 disposed between the bolt head 208 and the first component 216, the amount of torque required to continue rotating the bolt 202 increases. This curve 1204 is shown in the angle-torque trace 1200 from time $t_1$ to time $t_2$ and illustrates how the required torque for tightening the bolt 202 within the bore 220 increases from the initial contact of the bolt head 208 with the washer 212/first component 214 (at time $t_1$) to the final tightened position of the bolt 202 against the washer 212/first component 214 (at time $t_2$), which corresponds to the predetermined torque value stored in the device electronic processor 1055 for the proper tightening of the bolt 208.

In an exemplary embodiment of the disclosure, analyzing or reviewing the angle-torque trace 1200 involves a review of six (6) different tolerance areas of the angle-torque trace 1200, e.g., four (4) tolerance ranges and two (2) slopes on the curve 1204, that can be evaluated to detect defects in the bolt 202, the bore 220 or with the engagement of the bolt 202 within the bore 220. However, while the exemplary embodiment involves the analysis and determination of these six features, aspects or attributes of the angle-torque trace 1200, the angle-torque trace 1200 is a continuous curve, not a straight line or segments of straight lines, such that there are actually infinite slopes present at different points along the trace 1200, each of which can be selected for analysis for the purposes of the present disclosure.

The first tolerance range, or Tol-1, illustrates the actual final torque value for the full engagement of the bolt head 208 with/against the washer 212 and/or first component 216 and verifies if the actual applied torque for the particular bolt 202 is within the tolerance range for the predetermined torque value stored in the device electronic processor 1055. This range Tol-1 can be modified with a suitable standard deviation at on each extreme based on type of torque tool 1000 used in the installation process for the bolt according to the following table:

TABLE 1

| Standard Deviation For TOL-1 Based on Torque Tool Control | |
|---|---|
| Standard Deviation ($\sigma_1$) | Torque Tool Control Method |
| ±5% | Angle of Rotation Torque Control Wrench |
| ±23% | Torque-Sensing Manual Torque Wrench |
| ±29% | Clutch Style Manual Torque Wrench |
| ±43% | Momentum Controlled Tightening |

Should the final torque value be below Tol-1, in addition to indicating the bolt 202 needs to be tightened more to fall within the range of Tol-1, values below the range of Tol-1 can provide indications of excessive lubricating oil being present, a stripped joint, and/or an excessively large hole. Alternatively, if the final torque value is above Tol-1, this indicates that the bolt 202 needs to be loosened to fall within Tol-1, in addition to providing an indication that the driving tool is running too fast, resulting in the high final torque value.

The second tolerance range, or Tol-2, verifies the run down torque value necessary to move the bolt 202 through the bore 220 from time $t_0$ to time $t_1$. This range remains relatively constant across the entire time between initial engagement of the bolt 202 within the threaded bore 202 and initial engagement of the bolt head 208 with the first component 216 or washer 212 ($t_0$ to $t_1$) as the torque applied to the bolt 202 only needs to overcome the friction between the external threads 206 on the bolt 202 and the internal threads 224 within the bore 220. However, if the detected torque value from $t_0$ to $t_1$ exceeds the upper limit for Tol-2, this provides an indication of a number of potential faults such as: 1) the bolt 202 has become cross-threaded with the bore 220; 2) the tap (not shown) that initially formed the threads 224/bore 220 in the second component 222 has become worn and needs replacing to form accurate threaded bores 220; 3) the diameter of the shaft 204 of the bolt 202 varies from the expected diameter and does not correspond to the diameter of the bore 220; and/or 4) there is an excess of glue or other similar material on the threads 206,224 of the bolt 202 and/or bore 220 that is impeding the engagement of the bolt 202 within the bore 220.

The third tolerance range, or Tol-3, provides a range of time or angular rotation values for the run down angle, or the initial engagement of the bolt head 208 with the washer 212 or the first component 216 at the start of the curve 1204 from a time or angular rotation immediately prior to $t_1$ until a time or angular rotation immediately following $t_1$. The range of Tol-3 provides guidance on the timing of the end of the run down and engagement of the bolt head 208 with the washer 212 and/or first component 216. Should the point at the beginning of the curve 1204 on the trace 1200 at which the applied torque value changes corresponding to $t_1$ occur at an earlier point than within Tol-3, i.e., the expected range for $t_1$, this provides an indication that: 1) the angle at which the bolt shaft 204 was inserted into the bore 220 was not correct, e.g., was at an angle with regard to perpendicular to the bore 220; 2) the length of the shaft 204 of the bolt 202 was shorter than expected; 3) the bolt 202 has become cross-threaded with the bore 220; or 4) the washer 212 and/or the first component 216 positioned between the bolt head 208 and the second component 222 has a thickness greater than expected. Conversely, if the actual position or timing for $t_1$ a the beginning of the curve 1204 of the trace 1200 occurs after the range of Tol-3, this indicates that: 1) the length of the bolt shaft 204 was longer than expected; or 2) the washer 212 and/or first component 216 positioned between the bolt head 208 and the second component 222 has a thickness less than expected or is missing entirely.

The fourth tolerance range, or Tol-4, provides a range of time or angular rotation values for a total run down value at the end of the curve 1204 corresponding to range for the final engagement of the bolt head 208 with the washer 212 or the first component 216 from a time or angular rotation immediately prior to $t_2$ until a time or angular rotation immediately following $t_2$. The range of Tol-4 provides guidance on the timing of the end of the tightening torque curve 1204 of the trace 1200 of the bolt head 208 against the washer 212 and/or first component 216. Should the point on the curve 1204 at which the applied torque value changes corresponding to $t_2$ occur at an earlier point than within Tol-4, i.e., the expected range for $t_2$, this provides an indication that the material forming the bolt 202 does not provide enough stretch for the bolt 202, i.e., the material is too rigid. Conversely, if the point on the curve 1204 at which the applied torque value changes corresponding to $t_2$ occur at an earlier point than within Tol-4, i.e., the expected range for $t_2$, this provides an indication that the material forming the bolt 202 provides too much stretch for the bolt 202, i.e., the material is too soft.

In addition to the four tolerance ranges, the angle-torque trace 1200 also provides data concerning the shape of various portions of the curve 1204 itself, including, but not limited to, an initial torque slope $m_1$ and a final torque slope $m_2$.

The initial torque slope $m_1$ is located at the beginning of the curve 1204 starting at point $t_1$. The slope $m_1$ of the curve 1204 illustrates the rate of increase in the torque applied to the bolt 202 once the bolt head 208 is engaged with/against the first component 214 and/or washer 212 and provides an indication of: 1) any stiffness variation in either the material forming the bolt 202, washer 212 and/or the first component 216 (i.e., a steeper slope indicates a stiffer material, while a flatter slope indicates a softer material); or 2) the bolt shaft 206 bottoming out within the aperture/bore 220.

The final torque slope $m_2$ is located at the end of the curve 1204 ending at point $t_2$. The slope $m_2$ of the curve 1204 illustrates the rate increase of the torque applied to the bolt 202 as it reaches the predetermined torque value for proper engagement against the washer 212 and/or first component 212 and provides an indication of: 1) relaxation of the bolt joint 200 when the slope is flatter than predicted, which can be the result of the material forming the bolt 202, the washer(s) 212 and/or first component 216 being softer than expected; or 2) unwanted lubrication within the aperture/bore 220 resulting in slippage between the bolt threads 206 and internal bore threads 224.

Each of these six (6) exemplary aspects or attributes of the angle-torque trace 1200 are present in the recorded trace 1200 obtained by the tool 1000 during the driving of an individual bolt 202 to form the bolted joint 200. Either during or after the driving of the bolt 202, the tool 1000 can transmit the data forming the recorded trace 1200 formed by the electronic processor 1025 to the device electronic processor 1055. Within the processor 1055, and particularly within the program storage area within the device electronic processor 1055 is located a machine learning engine 2000 (FIG. 3). The machine learning engine 2000 is designed as an unsupervised machine learning engine, whereby the machine learning engine 2000 is designed to autonomously learn from the analyses performed by the machine learning engine 2000 in an unsupervised learning protocol without being provided pre-determined examples of anomalous and non-anomalous, or good and bad angle-torque traces that provide externally defined parameters to the machine learning engine 2000, greatly reducing the time required to enable the unsupervised machine learning engine 2000 to effectively analyze subsequent recorded angle-torque traces 1200.

To enable the unsupervised machine learning engine 2000 to perform the relevant analyses on the recorded angle-torque traces 1200 supplied from the tool 1000, initially the unsupervised machine learning engine 2000 is provided with a sample set of angle-torque traces 1200 on which to perform the analyses of the sample traces 1200, and determine different attributes of the sample traces 1200, e.g., the four tolerances, Tol-1, Tol-2, Tol-3 and Tol-4, and slopes, $m_1$, $m_2$, etc., to determine or "learn" the ranges for acceptable attributes of a subsequent recorded trace 1200 to be analyzed. As there are infinite slopes along the continuous curve of the angle-torque trace 1200, not just $m_1$ and $m_2$ as identified in the illustrated exemplary curve of FIG. 3, the machine learning engine 1200 may pick alternative and/or additional slopes to compare the curve of a recorded trace 1200 under analysis with the curve of a stored trace 1200' created by the engine 2000 and representing the acceptable parameters for the recorded trace 1200. Each sample/recorded trace 1200 will include multiple representative aspects or features, such as tolerances Tol-1, Tol-2, Tol-3 and Tol-4, and slopes, $m_1$, $m_2$, $m_3$, etc., similar to an n dimensional vector for the specific recorded trace 1200. Once provided the machine learning engine 2000, the engine 2000 then analyzes the recorded trace 1200, such as by comparing the distance between the two vectors representing the two traces 1200, i.e., the recorded trace 1200 and the stored trace 1200', to determine if the selected aspects of the recorded trace 1200 correspond sufficiently to the same aspects of the stored trace 1200'.

The number of aspects of each recorded trace 1200 selected to be compared with the aspects of the stored trace 1200' will be determined for each recorded trace 1200 by the machine learning engine 2000 in order to arrive at the ultimate decision regarding the acceptability of the fastener 202 represented by the recorded trace 1200 that was analyzed. For example, the machine learning engine 2000 may select an initial number of aspects or attributes of the recorded trace 1200 for comparison, and subsequently performs the analysis by comparing the selected attributes of the recorded trace with the same attributes of the stored trace 1200'. The results of this initial analysis can result in a determination by the machine learning engine 2000 that the bolt 202 either has or does not have any detected anomalies. However, if the machine learning engine 2000 requires additional analysis to make the determination, the machine learning engine 2000 can select additional attributes of the recorded trace 1200 for comparison with corresponding attributes of the stored trace 1200' to conduct an additional analysis on the recorded trace 1200. Further, the attributes to be compared can be selected by the machine learning engine 2000 on either the recorded trace 1200 or the stored trace 1200'.

In a particular exemplary embodiment, the unsupervised learning process or protocol for the machine learning engine 2000 involves providing the machine learning engine 2000 with approximately 50-60 sample torque traces 1200 from sample bolts 202. The machine learning engine 2000 subsequently utilizes the analysis of the sample traces 1200 to determine or create the stored trace 1200' representing the acceptable values for any subsequently analyzed recorded trace 1200 for a similar type of fastener/bolt 202, including, but not limited to, for example, the tolerance ranges Tol-1, Tol-2, Tol-3 and Tol-4, and slope parameters, $m_1$ and $m_2$. The stored trace 1200' with the acceptable attributes or aspects, e.g., tolerances and slope parameters, is stored in the device electronic processor 1055 and employed by the machine learning engine 2000 moving forward for all subsequent analyses of angle-torque traces 1200 recorded from the driving of the same type of bolts 202 by the tool 1000.

In operation of the apparatus including the tool 1000 and the remote device 1005 including the machine learning engine 2000, for each bolt 202 driven by the tool 1000, the tool records an angle-torque trace 1200 for the individual bolt 202. The traces 1200 recorded by the tool 1000 are sent to the remote device 1005 and stored by grouping the recorded traces 1200 according to the type of bolt 202 that generated the recorded trace 1200, rather than by serial number, class, size or randomly. When received in the device electronic processor 1055 after transmission from the tool 1000, the machine learning engine 2000 determines which type of bolt 202 formed the recorded trace 1200. The machine learning engine 2000 then locates the stored trace 1200' associated with that type of bolt 202 and compares attributes of the stored trace 1200' with the selected attributes, such as the tolerances and the slope parameters, of the recorded trace 1200 to perform the analysis on the recorded trace 1200. The analysis performed by the machine learning engine 2000 detects anomalies in the recorded trace 1200 regarding any of the selected attributes, e.g., tolerances. Tol-1, Tol-2, Tol-3 and Tol-4, or slope parameters, $m_1$, $m_2$, etc., relevant to the associated attributes of the recorded trace 1200. In this manner, the machine learning engine 2000 can evaluate the recorded traces 1200 of each bolt 202 on which the tool 1000 is utilized to ascertain various structural and material deficiency information in a streamlined and effective process. Additionally, the apparatus and method of this disclosure can perform this evaluation on each bolt 202 without the need for additional measurement hardware outside of the tool 1000 and remote device 1005 already utilized for driving the bolt 202, and by using data, i.e., the angle-torque traces 1200, already obtained by the tool 1000 during the driving of the bolts 202. Further, the analysis of the recorded traces 1200 by the machine learning engine 2000 can take place in real-time, with the results being provided to an operator of the tool 1000 directly after driving the fastener/bolt 202 in order to allow for immediate removal or adjustment of the bolt 202 during assembly of the medical device 218.

It is understood that the aforementioned compositions, apparatuses and methods of this disclosure are not limited to the particular embodiments and methodology, as these may vary. It is also understood that the terminology used herein is for the purpose of describing particular exemplary embodiments only, and is not intended to limit the scope of the present disclosure which will be limited only by the appended claims.

We claim:

1. A method for automatically detecting anomalies in the structure or material forming a fastener utilized in the assembly of a medical device, the method comprising the steps of:
   a. providing an apparatus comprising:
      i. a driving tool capable of recording an angle torque trace for a fastener driven by the tool to form a recorded trace; and
      ii. a processor operably connected to the driving tool and including an machine learning engine stored on the processor;
   b. creating a stored angle torque trace for comparison with the recorded trace components with the machine learning engine;
   c. driving a fastener to secure components of a medical device with the driving tool;
   d. recording data forming the angle-torque trace while driving the fastener to form the recorded trace; and
   e. comparing the stored angle-torque trace c with the recorded trace to detect anomalies,
   wherein the step of creating the stored trace comprises:
      i. providing a number of sample angle-torque traces to the machine learning engine;
      ii. conducting an unsupervised learning protocol with the machine learning engine on the sample angle-torque traces; and
      iii. defining attributes for the stored trace based on anomalies determined by the machine learning engine within the sample traces.

2. The method of claim 1 wherein the step of providing the number of sample angle-torque traces to the machine learning engine does not include providing examples of pre-determined anomalous and non-anomalous angle torque traces to the machine learning engine.

3. The method of claim 1 wherein the step of defining attributes for the stored trace comprises creating a tolerance ranges for one or more attributes of the stored traces.

4. The method of claim 3 wherein the tolerance range defines a range for a torque value attribute of the stored trace.

5. The method of claim 4 wherein the torque value attribute is a final torque value.

6. The method of claim 4 wherein the torque value attribute is a run down torque value.

7. The method of claim 4 wherein the torque value attribute is a run down angle value.

8. The method of claim 4 wherein the torque value attribute is a total run down value.

9. The method of claim 8 wherein the recorded trace is wirelessly transmitted to the processor.

10. The method of claim 3 wherein the tolerance range defines a range for a slope attribute of the recorded trace.

11. The method of claim 10 wherein the slope attribute is a final torque slope.

12. The method of claim 1 wherein the step of comparing the stored trace with the recorded trace comprises:
    a. selecting a number of attributes of one of the recorded trace or the stored trace to compare with the attributes of the other of the recorded trace or the stored trace; and
    b. comparing the selected attributes to detect anomalies in the recorded trace.

13. The method of claim 12 wherein the step of selecting the number of attributes is performed by the machine learning engine.

14. The method of claim 1 further comprising the step of transmitting the recorded trace to the processor after driving the fastener.

15. The method of claim 1 wherein the steps of recording the data to form the recorded trace and comparing the recorded trace to the stored trace are simultaneous.

16. The method of claim 1 further comprising the step of grouping the recorded traces by fastener type after recording the angle-torque trace.

17. The method of claim 1 further comprising the step of removing a fastener in which anomalies are detected after comparing the recorded trace to the stored trace.

* * * * *